United States Patent [19]

Sakamoto

[11] 4,371,294
[45] Feb. 1, 1983

[54] SLURRY CONVEYOR SYSTEM

[75] Inventor: Masakatsu Sakamoto, Matsudo, Japan

[73] Assignee: Hitachi, Ltd., Tokyo, Japan

[21] Appl. No.: 232,002

[22] Filed: Feb. 6, 1981

[30] Foreign Application Priority Data

Feb. 8, 1980 [JP] Japan ................................. 55/13714

[51] Int. Cl.³ ............................................ B65G 53/30
[52] U.S. Cl. .................................. 406/109; 137/566; 138/26; 138/31; 406/192
[58] Field of Search .............. 406/109, 128, 130, 146, 406/192; 137/566; 138/26, 31; 414/217

[56] References Cited

U.S. PATENT DOCUMENTS 3,449,013 6/1969 Sakamoto et al. .................. 406/109
4,029,362 6/1977 Kortenbusch .................. 406/109 X

FOREIGN PATENT DOCUMENTS 52-44993 4/1977 Japan .................................. 406/109

OTHER PUBLICATIONS

"Hitachi Hydraulic Transportation System Hydrohoist"; Samamoto et al.; Hitachi Review vol. 30, No. 5, pp. 269-274; 1981.

Primary Examiner—Jeffrey V. Nase
Attorney, Agent, or Firm—Antonelli, Terry & Wands

[57] ABSTRACT

A slurry conveyor system in which a mixture liquid is charged into a supply pipe by a low-pressure mixture liquid pump through a valve, and, thereafter, fresh water of high pressure is supplied by a high-pressure fresh water pump into the supply pipe by a switching of the valve, thereby to force the mixture liquid from the supply pipe into a convey pipe to continuously convey the slurry. The supply pipe is provided with a pressure adjusting device for increasing or decreasing the pressure in the supply pipe to equalize this pressure to the pressure in a pipe connected to the supply pipe, thereby to facilitate the opening of the valve disposed between the supply pipe and the pipe connected to the latter.

4 Claims, 2 Drawing Figures

SLURRY CONVEYOR SYSTEM

BACKGROUND OF THE INVENTION

The present invention relates to a slurry conveyor system and, more particularly, to an improvement in the slurry conveyor system of the type adapted to convey the slurry by means of pressurized water.

A typical conventional slurry conveyor system of the type described has a plurality of supply pipes, a high-pressure fresh water pump connected through pipes having valves to the inlet sides of the supply pipes, a mixture convey pipe connected to the outlet sides of the supplying pipes through valves, a low-pressure mixture pump connected, through a supply passage having a valve, to the outlet sides of the inlet side valves of the supply pipes, and a low-pressure fresh water return pipe connected, through a conduit having a valve, to the inlet sides of the outlet side valves of the supply pipes.

The valve between the supply pipes and the high-pressure fresh water pump is represented by A, while the valve between the supply pipes and the low-pressure mixture pump is expressed by B. Similarly, the valve between the supply pipes and the mixture convey pipe, and the valve between the supply pipes and the low-pressure fresh water return pipe are expressed by C and D.

The mixture liquid delivered by the low-pressure mixture pump is supplied to the supply pipes, as the low-pressure mixture pump is started with the valves B and D being opened while the valves A and C are kept closed. When the supply pipes are filled with the mixture liquid, the valves B and D are closed while the valves A and C are opened, and the high-pressure fresh water pump is started. As a result, the mixture liquid filling the supply pipes are forced into the convey pipe by the pressurized fresh water.

In this known slurry conveyor, a pressure equalizing valve is disposed across each of the valve A and D. This equalizing valve is opened in advance to the opening of the valve A or D, in order to equalize the pressure across the valve A or D, i.e. to extinguish the pressure difference between the pressure inside the supply pipe and the high-pressure fresh water supply pipe or the pressure difference between the pressure inside the supply pipe and the pressure in the fresh water return pipe, thereby to facilitate the opening of the valve A or D.

Namely, if there is no pressure equalizing valve mentioned above is not used, the valve A or D, which is pressed against the associated valve seat by a large force, particularly when the valve is of the plate type, requires an impractically large opening force. In addition, the valve is worn down rapidly. It is also to be noted that, when the valve is opened abruptly, the pressurized liquid is allowed to expand rapidly with a consequent contraction of the liquid, the pressure is increased or decreased abruptly to cause a water hammer or to generate an impact and noise.

In the case where the slurry discharge pressure is not so high, only one pressure equalizing valve provided in each of the fresh water supply pipe and fresh water return pipe can function satisfactorily. However, in the event that the discharge pressure is high, e.g. 100 kg/cm$^2$ or higher, another problem rises as to the opening of the pressure equalizing valve itself, because of too large pressure differential across the equalizing valve itself. Namely, an impractically large opening force is required for opening the equalizing valve and the wear of the equalizing valve and the valve seat is promoted. Once the valve and or the valve seat is damaged, the water under high pressure will leak through the damaged part at a high velocity to erode the valve and valve seat to shorten the life of the pressure equalizing valve.

SUMMARY OF THE INVENTION

It is, therefore, a principal object of the invention to provide a slurry conveyor system using pressurized water, capable of operating at an enhanced pressure.

To this end, according to the invention, there is provided a slurry conveyor system of the type having a plurality of supply pipes arranged in a side-by-side relation, a low-pressure mixture pump for filling the supply pipes with a mixture liquid and a high-pressure fresh water pump adapted to force the mixture liquid in the supply pipes into a convey pipe 5, wherein the improvement comprises that each of the supply pipes is provided with pressure adjusting device adapted to increase or decrease the pressure in each supply pipe to make it possible to equalize the pressure in the supply pipe and the pressure in a pipe connected to the supply pipe, before opening of a valve disposed between the supply pipe and the pipe connected to the supply pipe.

These and other objects, as well as advantageous features of the invention will become clear from the following description of the preferred embodiments taken in conjunction with the accompanying drawings.

DESCRIPTION OF THE PREFERRED EMBODIMENT

A preferred embodiment of the invention will be described hereinunder with reference to the attached drawings.

Figure 1:
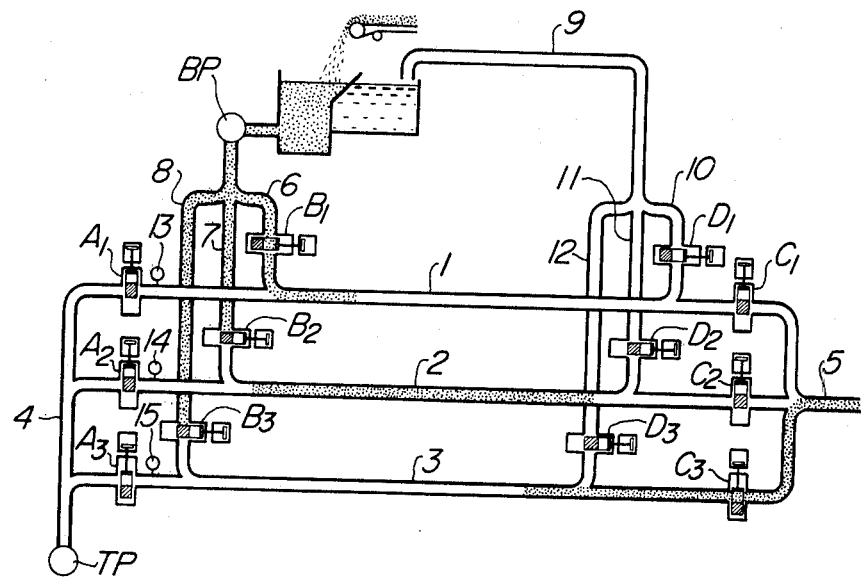
FIG. 1 is a system diagram of a slurry conveyor system in accordance with the invention and FIG. 2 is a detailed illustration of a pressure adjusting device incorporated in the slurry conveyor system shown in FIG. 1.

Referring first to FIG. 1, a slurry conveyor system embodying the present invention has a plurality of supply pipes 1, 2, 3 arranged in side-by-side or parallel relation and having valves $A_1$, $A_2$, $A_3$. A high-pressure fresh water pump Tp is connected to the inlet sides of the valves $A_1$, $A_2$, $A_3$ through a pipe 4. The supply pipes 1, 2, 3 are provided also with valves $C_1$, $C_2$, $C_3$ to the outlet side of which connected is a common high-pressure mixture convey pipe 5. A booster or low-pressure mixture pump Bp is connected, through supply passages 6, 7, 8 having valves $B_1$, $B_2$, $B_3$, to the outlet sides of the valves $A_1$, $A_2$, $A_3$.

A reference numeral 9 designates a low-pressure fresh water return pipe which is connected, through pipes 10, 11, 12 having valves $D_1$, $D_2$, $D_3$, to the inlet sides of the valves $C_1$, $C_2$, $C_3$ of the supply pipes 1, 2, 3. The supply pipes 1, 2, 3 are provided with pressure adjusting devices 13, 14, 15, respectively.

In operation, as the low-pressure mixture pump Bp is started with the valves $B_1$, $B_2$, $B_3$ and $D_1$, $D_2$, $D_3$ opened while the valves $A_1$, $A_2$, $A_3$ and $C_1$, $C_2$, $C_3$ being closed, the mixture liquid coming from the low-pressure mixture pump is charged into the supply pipes 1, 2, 3 to fill the latter. Then, the valves $B_1$, $B_2$, $B_3$ and $D_1$, $D_2$, $D_3$ are closed while the valves $A_1$, $A_2$, $A_3$ and $C_1$, $C_2$, $C_3$ are opened, and the high-pressure fresh water pump Tp is started, so that the mixture liquid in the supply pipes 1, 2, 3 is forced by the fresh water of high pressure into the mixture convey pipe 5.

The above-described operation is made repetitionally for successive one of the supply pipes 1, 2, 3, while continuously operating the high-pressure fresh water pump Tp and the low-pressure mixture liquid pump Bp, thereby to continuously convey the slurry.

The pressure adjusting devices 13, 14, 15 associated with respective supply pipes 1, 2, 3 have an identical construction. Therefore, in this specification, the pressure adjusting device 13 attached to the supply pipe 1 will be described as a representative.

Figure 2:
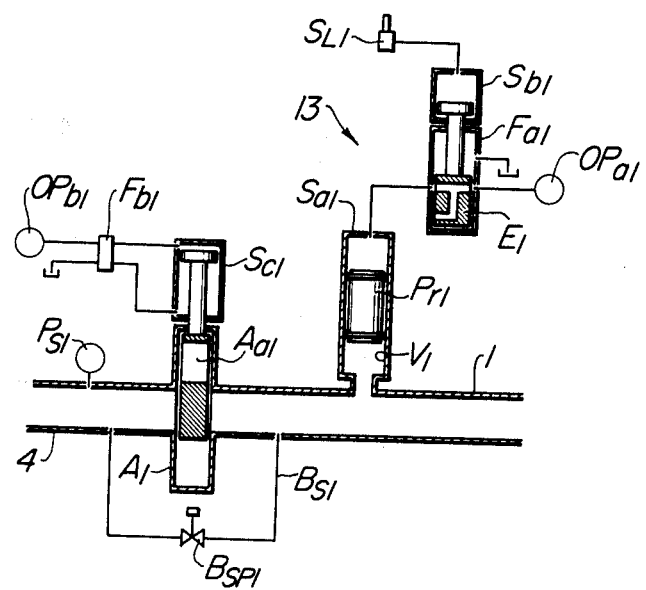

As will be seen from FIG. 2, the pressure adjusting device 13 has a vessel $V_1$ connected to the portion of the bore of the supply pipe 1 near the valve $A_1$, a plunger $Pr_1$ accomodated by the vessel $V_1$ and adapted to be actuated by a single-acting hydraulic cylinder $Sa_1$, a hydraulic pump $OPa_1$ adapted to supply pressurized working oil to the hydraulic cylinder $Sa_1$ via a two-way change-over valve $Fa_1$ accomodating a valve body $E_1$, and a hydraulic cylinder $Sb_1$ under a control of a solenoid valve $SL_1$ and adapted to actuate the hydraulic cylinder $Sb_1$.

A symbol $Sc_1$ designates a hydraulic cylinder adapted to actuate the valve body $Aa_1$ incorporated in the valve $A_1$, while $OPb_1$ represents a hydraulic pump which is adapted to supply the hydraulic cylinder $Sc_1$ with the pressurized working oil through a change-over valve $Fb_1$. A pressure switch $Ps_1$ is attached to the pipe 4. A bypass passage $Bs_1$ directly connect the supply pipe 1 to the pipe 4 detouring the valve $A_1$ and having a bypass valve $Bsp_1$ disposed therein.

The pressure adjusting device having the described construction operates in a manner explained hereinunder.

When the valve body $Aa_1$ of the valve $A_1$ is raised by the action of the hydraulic cylinder $Sc_1$ to take the closing position, in order to equalize the pressure in the supply pipe 1 with the pressure in the pipe 4 by increasing the pressure in the supply pipe 1, the change-over valve $Fa_1$ is switched to permit the pressurized oil from the hydraulic pump $OPa_1$ to be supplied to the cylinder $Sa_1$, thereby to lower the plunger $Pr_1$. In consequence, the pressure in the supply pipe 1 is increased. As this pressure is increased to the same level as the pressure in the pipe 4, the plunger $Pr_1$ stops to move. Thereafter, the hydraulic cylinder $Sc_1$ is actuated to lower the valve body $Aa_1$ of the valve $A_1$ to bring the supply pipe 1 into communication with the pipe 4, so that the mixture liquid in the supply pipe 1 is forced into the convey pipe 5 (See FIG. 1) by the pressure of water supplied through the pipe 4.

Although the operation of the pressure adjusting device has been described with reference to a case where the pressure in the supply pipe 1 is increased to be equalized with the pressure in the pipe 4, it will be clear to those skilled in the art that the same principle can be applied also to the case where the pressure in the supply pipe 1 is lowered to be equalized to the pressure in the low-pressure fresh water return pipe, in order to facilitate the opening of the valve in the low-pressure fresh water return pipe to permit the low-pressure fresh water in the supply pipe 1 to be returned to a water tank.

If it is required to strictly equalize the pressure in the supply pipe to the pressure in the pipe connected to the latter, the pressure in the hydraulic cylinder $Sa_1$ is controlled by the pressure switch $Ps_1$ or, alternatively, the bypass valve $Bsp_1$ is opened after operation of the pressure adjusting device. In the latter case, there is no fear of breakdown of the bypass valve $Bsp_1$, because the pressure differential across the latter has been decreased to a sufficiently small level thanks to the operation of the pressure adjusting device.

The rate of increase or decrease of the pressure in the supply pipe 1 can easily be controlled by adjusting the signal of the pressure switch $Ps_1$ in proportion to the oil pressure in the hydraulic cylinder $Sa_1$.

According to the invention, as will be understood from the foregoing description, it is possible to increase or decrease the pressure in the supply pipe to equalize this pressure to the pressure in the pipe connected to the supply pipe, without using pressure qualizing pipe which cannot withstand high pressure, so that the slurry conveyor system can operate at an increased operating pressure.

What is claimed is:

1. In a slurry conveyor system using pressurized water, having a plurality of supply pipes arranged in parallel relation, valves disposed in said supply pipes, a low-pressure mixture pump adapted to charge mixture liquid into said supply pipes, and a high-pressure fresh water pump adapted to force the mixture liquid in said supply pipes into a convey pipe, an improvement which comprises a pressure adjusting means in each supply pipe for varying the volume within the supply pipes to increase or decrease the pressure in said supply pipes to equalize said pressure to the pressure in a pipe connected to each of said supply pipes before opening a valve disposed between each of said supply pipes and said pipe connected to each of said supply pipes.

2. A slurry conveyor system as claimed in claim 1, wherein said pressure adjusting means associated with each supply pipe has a vessel communicating with the inside of said supply pipe and a plunger housed by said vessel, said plunger varying the volume of the space in said vessel communicating with the inside of said supply pipe.

3. A slurry conveyor system as claimed in claim 2, wherein said plunger of said pressure adjusting means is actuated by hydraulic means.

4. A slurry conveyor system as claimed in claim 1, characterized by further comprising a bypass valve disposed in parallel with each of the valve in the pipe for supplying the pressurized fresh water to said supply pipe and the valve in the pipe through which the fresh water is returned from said supply pipe, each of said bypass valve being opened after the operation of said pressure adjusting means for increasing or decreasing the pressure in said supply pipe to a level substantially equal to the pressure in said pipe having said bypass valve.

* * * * *